H. A. HILLS.
FILTER.
APPLICATION FILED JUL. 28, 1916.

1,262,495.

Patented Apr. 9, 1918.

Witnesses

Inventor
Henry A. Hills
Atty.

UNITED STATES PATENT OFFICE.

HENRY A. HILLS, OF GRAND RAPIDS, MICHIGAN.

FILTER.

1,262,495.

Specification of Letters Patent.

Patented Apr. 9, 1918.

Application filed July 28, 1916. Serial No. 111,909.

*To all whom it may concern:*

Be it known that I, HENRY A. HILLS, a citizen of the United States, and a resident of the city of Grand Rapids, in the county of Kent and State of Michigan, have invented certain new and useful Improvements in Filters; and I do hereby declare that the following is a full, clear, and exact description of the same, reference being had to the accompanying drawings, and to the numerals of reference marked thereon, which form a part of this specification.

This invention relates to an improved type of small filter particularly designed for private garage use in filtering the cylinder oil from the crankcase of an engine so that the oil may be reused instead of thrown away. The fluid to be filtered is caused to traverse a tortuous passage and passed through different series of filtering means whereby a rapid and efficient filtration of the fluid is assured.

It is an object therefore of this invention to construct a filter wherein the fluid to be filtered is caused to travel through a series of compartments, each provided with filtering material, in a manner to thoroughly and efficiently filter the fluid, so that the fluid drawn off from the last compartment is entirely free from foreign matter and impurities.

It is also an object of this invention to provide a filter comprising a plurality of concentrically arranged filtering compartments wherein the fluid is introduced into a central compartment and caused to traverse a tortuous passage through the respective concentric compartments and finally drawn off from the outermost thereof in a purified condition.

It is furthermore an important object of this invention to construct a filter embracing a number of concentric filtering compartments arranged one within the other whereby a flow of fluid during a filtering operation takes place from the innermost to the outermost compartment through suitable filtering material disposed in each compartment to effect final purification of the fluid in its passage through the filter.

The invention (in a preferred form) is illustrated in the drawings and hereinafter more fully described.

Figure 1:
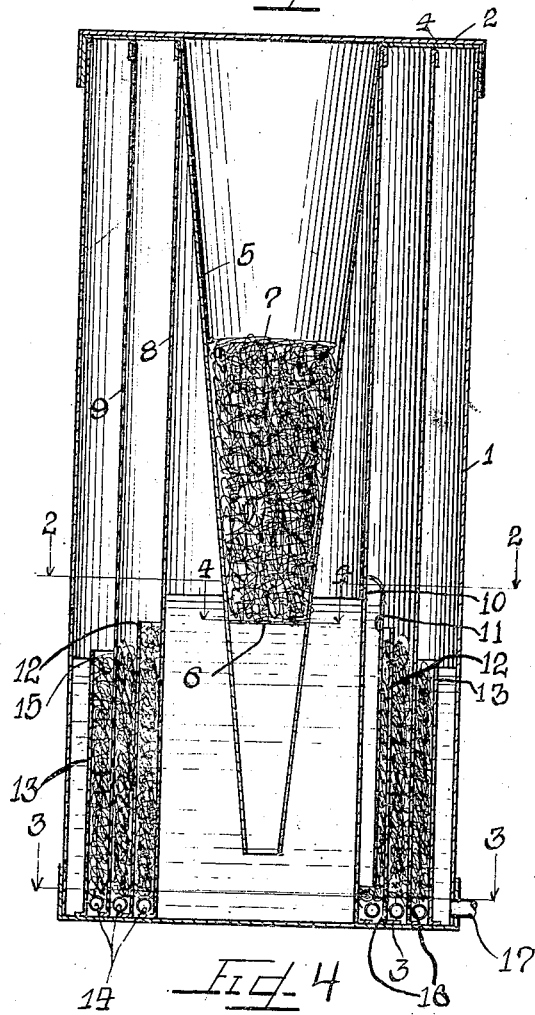
Figure 1 is a central vertical section taken through a filter embodying the principles of my invention.
Figure 2:
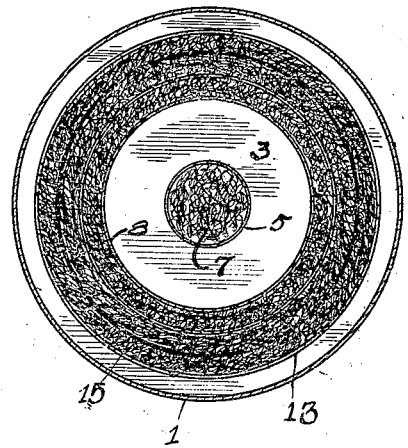
Fig. 2 is a detail section on line 2—2 of Fig. 1.
Figure 3:
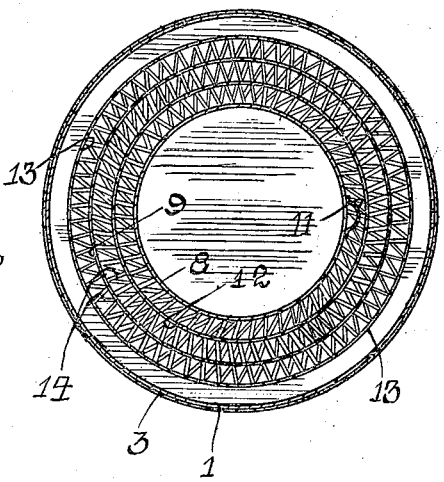
Fig. 3 is a detail section on line 3—3 of Fig. 1.
Figure 4:
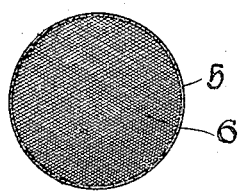
Fig. 4 is a detail section on line 4—4 of Fig. 1.

The reference numeral 1, indicates a casing cylinder provided with a flanged top cover 2, and a bottom cover or head 3. Interposed beneath the top cover 2, is a flanged inner cover member which is provided with a relatively large central aperture, and extending downwardly therefrom and integral therewith or riveted therearound is a long depending conical member 5. The lower end of the conical member 5, is open and spaced a slight distance from the bottom 3, of the filter, and mounted transversely within said conical member 5, a short distance from the lower open end thereof is a screen 6, upon which a quantity of filtering material 7, is supported.

Mounted in concentric relation within the cylinder 1, are smaller cylinders 8 and 9, respectively, of which the cylinder 8, is flanged at its lower end and is secured upon the bottom 3, and at its upper end projects beneath the flanged end of the conical member 5, and the cylinder 9, is flanged at its lower end and also secured upon the bottom 3, and being of greater diameter than the cylinder 8, is spaced therefrom and also from the walls of the main cylinder 1. An aperture 10, is provided in the inner cylinder 8, slightly below the middle thereof, and secured on the exterior surface of said cylinder and registering with said aperture, is a rounded channel member 11, which provides a passage leading downwardly from said aperture to near the bottom 3, of the filter. Mounted between the respective cylinders 8 and 9, and extending upwardly from the bottom 3, to a point slightly below the aperture 10, is a concentrically disposed cylinder 12, and similarly between the cylinder 9, and the walls 1, of the casing of the filter, another cylinder 13, is disposed, which is of slightly less height than said cylinder 12. Laid upon the bottom 3, of the filter, between the respective cylinders 8, 12, 9, and 13, are coiled springs 14, and packed between the walls of said respective cylinders and held spaced from the floor 3, by said coiled springs 14, is a filtering material 15. A plurality of apertures 16, are provided in the lower end of the cylinder 9, to afford communication between the compartments on each side thereof, and an outlet pipe 17, communicates through the walls 1, of the filter, through which the purified fluid may be drawn off.

The operation is as follows:

The fluid to be filtered is admitted into the filter by removal of the cover 2, and pouring the oil into the cone 5, after which it passes downwardly through the filtering material 7, of the conical member 5, into the lower end of the cylinder, rising within the cylinder 8, to the aperture 10, and then flowing outwardly therethrough and downwardly through the passage afforded by the tubular member 11, to the lower end of the compartment between the small cylinder 12, and cylinder 8, and is distributed evenly over the bottom of the compartment owing to the space afforded by the springs 14. The fluid then rises upwardly through the filtering material 15, and spills over the upper edge of the small cylinder 12, and passes downwardly through the additional filtering material 15, to the bottom of the filter and through apertures 16, in the lower end of the cylinder 9, rising upwardly within the small cylinder 13, and the filtering material, and thereafter spilling over the upper edge thereof into the free space between the small cylinder 13, and the outer wall 1, of the filter. The coiled springs 14, at the bottom of the filter serve to maintain the filtering material 15, spaced therefrom, so that the passages from the various annular compartments one to another will not become closed by the filtering material. The purified fluid is drawn off through the outlet pipe 17. Access to the interior of the filter is readily had through the upper end thereof for cleaning or replacement of the filtering material 15.

I am aware that various details of construction may be varied through a wide range without departing from the principles of this invention, and I therefore do not purpose limiting the patent granted otherwise than necessitated by the prior art.

I claim as my invention:

1. A filter of the class described having an inlet and outlet, comprising a plurality of concentrically arranged cylinders, a plurality of annular compartments afforded thereby, filtering material disposed in said annular compartments constraining the fluid to traverse a tortuous passage through the filtering material passing from the inlet to the outlet of the filter and a coiled spring in each cylinder containing filtering material for spacing the material from the bottom of the filter.

2. In a filter of the class described, an inlet and outlet therefor, a plurality of concentrically arranged cylinders affording a plurality of annular compartments, filtering material disposed in certain of said compartments whereby the fluid being filtered is constrained to traverse a tortuous passage therethrough, a conical filtering member mounted centrally within said filter having its small end extending closely to the bottom of the filter adapted to receive the fluid passed therethrough as it first enters the filter, filtering material therein and a screen in the conical filtering members for supporting the filtering material.

3. A filter comprising a casing, a plurality of concentric members therein dividing the casing into a plurality of chambers, concentric members, one disposed between the aforesaid members and one between the members and the casing providing a plurality of short annular chambers, all of said concentric chambers communicating and forming a tortuous passage for the passage of fluid to be filtered therethrough, filtering material disposed in some of said chambers, means for supporting the filtering material and spacing the same from the bottom of the chambers, a central member depending into the casing, and filtering material therein.

4. A filtering device comprising a casing, a plurality of concentric cylinders in said casing extending the full length thereof and one apertured at the bottom and another apertured higher up in the casing, a conical member projecting into the interior cylinder with a lower open end projecting below the aperture in one of the cylinders and a plurality of short cylinders of different lengths disposed alternately with the long cylinders and a filtering material disposed in said cone and between some of the cylinders.

5. A filtering device comprising a casing, a plurality of concentric cylinders in said casing extending the full length thereof and one apertured at the bottom and another apertured higher up in the casing, a conical member projecting into the interior cylinder with a lower open end projecting below the aperture in one of the cylinders, a plurality of short cylinders of different lengths disposed alternately with the long cylinders, a filtering material disposed in said cone and between some of the cylinders, and a plurality of members in said cylinders resting on the bottom of the casing and filtering material supported between the cylinders.

6. A filtering device comprising a casing, an inner cylinder, a passage extending from a point above the bottom to a point close to the bottom, a short cylinder extending from the bottom to a point below the top of said passage, a cylinder outside of said short cylinder and longer than the same, said cylinder having an opening at the bottom, a short cylinder outside of said last named cylinder and a conical member extending from the top of the casing into the first named cylinder having its lower end disposed between the openings in said passage.

7. A filter comprising alternately disposed concentric long and short cylinders having communicating passages, coiled springs in the bottom of some of said cylinders and filtering material supported on said coiled springs.

8. A filter comprising alternately disposed concentric long and short cylinders having communicating passages, coiled springs in the bottom of some of said cylinders, filtering material supported on said coiled springs, the outer and inner cylinders having no filtering material therein, a conical member extending into the inner cylinder and filtering material therein.

In testimony whereof I have hereunto subscribed my name in the presence of two subscribing witnesses.

HENRY A. HILLS.

Witnesses:
CHARLES W. HILLS, Jr.,
EARL M. HARDINE.

Copies of this patent may be obtained for five cents each, by addressing the "Commissioner of Patents, Washington, D. C."